UNITED STATES PATENT OFFICE.

GILBERT BOGART, WILLIAM H. CRAMER, AND WILLIAM L. LEWIS, OF LAPORTE CITY, IOWA.

IMPROVEMENT IN BUTTER-COLORING COMPOUNDS.

Specification forming part of Letters Patent No. 142,891, dated September 16, 1873; application filed July 29, 1873.

*To all whom it may concern:*

Be it known that we, GILBERT BOGART, WILLIAM H. CRAMER, and WILLIAM L. LEWIS, of Laporte City, in the county of Black Hawk and in the State of Iowa, have invented certain new and useful Improvements in Butter-Coloring; and do hereby declare that the following is a full, clear, and exact description thereof.

The nature of our invention consists in a compound or composition for coloring butter.

In order to enable others skilled in the art to which our invention appertains to make and use the same, we will now proceed to describe the mode of making and using our butter-coloring.

The compound is composed of the following ingredients, in about the following proportions, viz: Annattoine, five ounces; curcuma, pulverized, six ounces; saffron, one ounce; lard-oil, one pint; butter, five pounds.

The butter is first melted, and strained through a cloth, and the saffron is made into half a pint tincture of saffron. The tincture of saffron, butter, and curcuma are then placed in a boiler and allowed to boil for about fifteen minutes, after which it is all strained through a cloth. This strained compound is then put back into the boiler, and the annattoine and lard-oil added, when the whole is allowed to boil for about fifteen minutes. Afterward it is strained again through a cloth and stirred until cool.

The amount of coloring thus obtained will be sufficient to color about six thousand pounds of butter.

Having thus fully described our invention, what we claim as new, and desire to secure by Letters Patent, is—

The compound described, consisting of annattoine, saffron, lard-oil, and butter, all as and for the purposes set forth.

In testimony that we claim the foregoing we have hereunto set our hands this 21st day of July, 1873.

GILBERT BOGART.
WILLIAM H. CRAMER.
WILLIAM L. LEWIS.

Witnesses:
A. N. MARR,
J. M. MASON.